(12) United States Patent
Møller et al.

(10) Patent No.: US 9,546,333 B2
(45) Date of Patent: Jan. 17, 2017

(54) FATTY ACID ESTER BASED FIRELIGHTER

(75) Inventors: Kristian Kragh Møller, Mårslet (DK);
Per Henry Pedersen, Terndrup (DK)

(73) Assignee: Loutbrogaard Holding ApS, Terndrup (DK)

( * ) Notice: Subject to any disclaimer, the term of this patent is extended or adjusted under 35 U.S.C. 154(b) by 905 days.

(21) Appl. No.: 13/636,553

(22) PCT Filed: Mar. 22, 2011

(86) PCT No.: PCT/DK2011/050094
§ 371 (c)(1),
(2), (4) Date: Nov. 28, 2012

(87) PCT Pub. No.: WO2011/116772
PCT Pub. Date: Sep. 29, 2011

(65) Prior Publication Data
US 2013/0067804 A1    Mar. 21, 2013

(30) Foreign Application Priority Data

Mar. 22, 2010 (DK) .................... 2010 70116

(51) Int. Cl.
*C10L 11/04* (2006.01)
*C10L 5/02* (2006.01)
*C10L 10/02* (2006.01)
*C10L 7/02* (2006.01)

(52) U.S. Cl.
CPC .............. *C10L 11/04* (2013.01); *C10L 5/02* (2013.01); *C10L 7/02* (2013.01); *C10L 10/02* (2013.01); *C10L 2200/0476* (2013.01); *C10L 2230/04* (2013.01); *C10L 2230/10* (2013.01); *C10L 2250/04* (2013.01)

(58) Field of Classification Search
USPC .................................................. 44/579
See application file for complete search history.

(56) References Cited

FOREIGN PATENT DOCUMENTS

| DE | 19700161 | | 7/1998 |
|---|---|---|---|
| EP | 0874038 | | 4/1998 |
| EP | 1149888 | | 10/2001 |
| EP | 1132456 B1 | | 10/2003 |
| GB | 2316950 | * | 3/1998 |
| GB | 2316950 B | | 1/1999 |
| WO | WO-2010/091690 | | 8/2010 |

OTHER PUBLICATIONS

English machine translation of EP0874038.
English machine translation of EP1149888, Oct. 31, 2001.
English machine translation of DE19700161, Jul. 9, 1998.
A machine translation of the Abstract, claims and description of foreign patent document No. EP-1132456-B1, Oct. 1, 2003.
The Search Report in counterpart application No. PCT/DK2011/050094, Mar. 22, 2011.

* cited by examiner

*Primary Examiner* — Ellen McAvoy
*Assistant Examiner* — Chantel Graham
(74) *Attorney, Agent, or Firm* — Dinsmore & Shohl LLP

(57) ABSTRACT

A solid firelighter is provided, which comprises a carboxylic acid and/or an alkyl ester derivative thereof and a curable resin. The firelighter specifically comprise methyl, ethyl, propyl, or buthanoyl esters of a $C_6$-$C_{10}$ carboxylic acid or mixtures thereof in an amount of at least 20% by weight. Moreover, a method of manufacturing said firelighter is provided, as well as compositions for use in the manufacture of said firelighter.

22 Claims, 1 Drawing Sheet

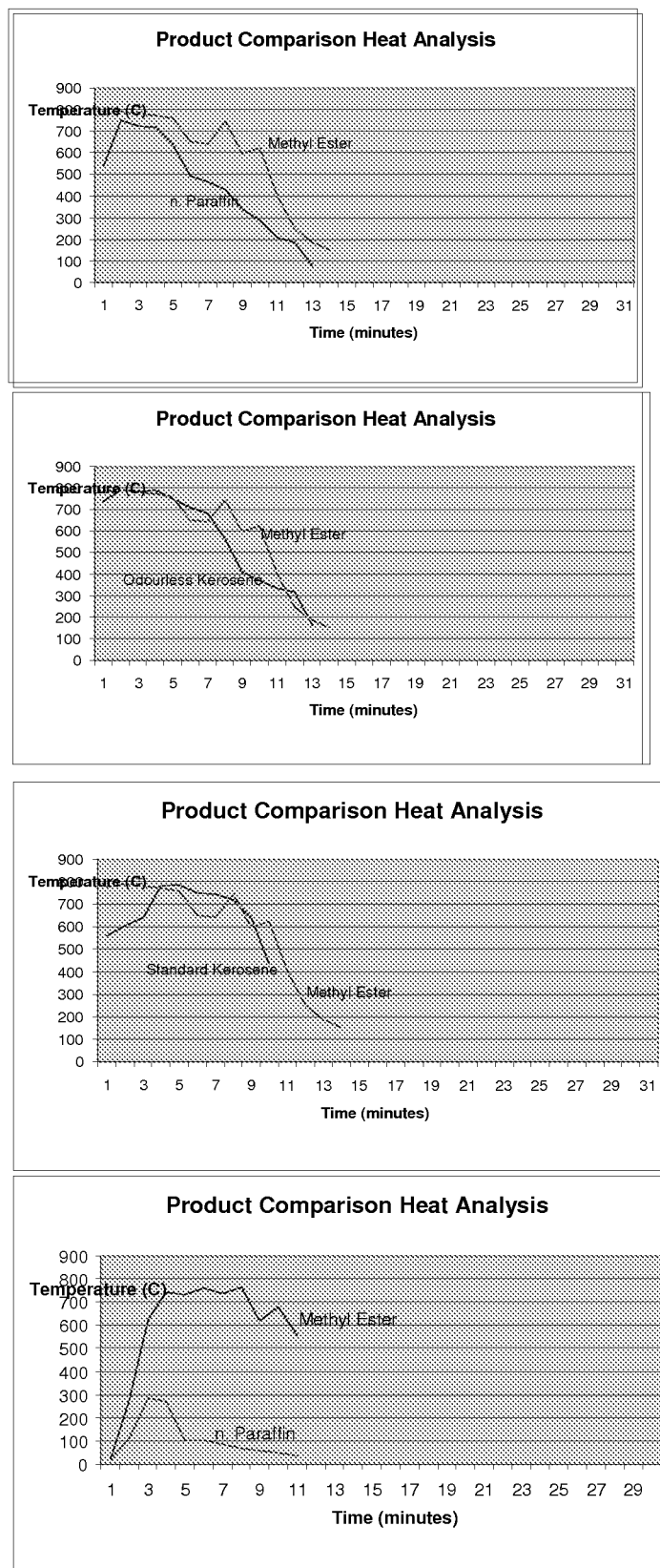

FATTY ACID ESTER BASED FIRELIGHTER

FIELD OF THE INVENTION

The present invention relates to a firelighter, which comprises a carboxylic acid and/or an alkyl ester derivative thereof and a curable resin.

REFERENCE TO RELATED APPLICATIONS

This utility patent application is a U.S. National Phase of PCT/DK2011/050094, filed Mar. 22, 2011, which claims priority from PA 2010 70116, filed Mar. 22, 2010, the entire contents of which are incorporated herein by reference.

BACKGROUND OF THE INVENTION

The present invention relates to firelighters for solid fuel fires.

Lighting solid fuel fires constructed of coal, charcoal, peat and the like presents a number of practical difficulties since most solid fuels are slow burning and difficult to light but release appreciable amounts of energy when lit. The ignition of coal fires can be assisted by the use of commercially available firelighters. These are used by placing the firelighter block in the hearth where the fire is to be made, lighting the block and then placing coal on top of the firelighter block in an attempt to light the coal from the block.

In general, firelighters consist of a solid generally cubic firelighter block containing a petroleum-based fuel, typically paraffin/kerosene. In a typical firelighter, urea-formaldehyde is utilized as a curable resin, which is combined with the petroleum-based fuel. Petroleum-based firelighters typically have a bad odor before burning, and a sooty flame. Moreover, kerosene/paraffin fuels suffer from the major drawback that they are highly toxic, especially upon ingestion. Even the slightest quantities of these dangerous fuels are sufficient to give heavy lung damages, for example chemical pneumonia, which in worst cases may be mortal.

In the present invention, the petrol-based fuel in a firelighter has been replaced with a fatty acid ester fuel, typically $C_6$ to $C_{12}$ fatty acid esters. Firelighters based on $C_6$ to $C_{12}$ fatty acid ester fuel are non-toxic, have no significant odor, and provide a stable, long-lasting flame.

SUMMARY OF THE INVENTION

Solid firelighters comprising carboxylic acid esters as combustible fuel is provided herein, as well as methods of producing such firelighters. The carboxylic acid esters are primarily methyl or ethyl esters of $C_6$ to $C_{12}$ carboxylic acids. Thus, in one aspect, the present invention relates to a firelighter comprising one or more $C_6$-$C_{10}$ carboxylic acids and/or alkyl esters thereof or mixtures thereof, and a curable resin.

In a similar aspect, the invention relates to a solid firelighter comprising 20-95% by weight one or more methyl, ethyl, propyl, or buthanoyl esters of a $C_6$-$C_{10}$ carboxylic acid or mixtures thereof, and a curable resin.

The alkyl components in the esters are for example short chain moieties, such as $C_1$ to $C_6$. In a preferred embodiment, the one or more alkyl esters are methyl or ethyl esters of a $C_6$-$C_{10}$ carboxylic acid or mixtures thereof.

The firelighter preferably comprises between 55 and 85% by weight of said alkyl esters, such as 20-85% by weight of methyl, ethyl, propyl, or buthanoyl esters of a $C_6$-$C_{10}$ carboxylic acid or mixtures thereof, for example between 55 and 85% by weight methyl hexanoate and/or ethyl hexanoate. Moreover, the firelighter preferably comprises less than 55% by weight of any $C_{12}$ or higher order carboxylic acid or alkyl esters thereof, such as less than 45% by weight of any $C_{12}$ or higher order carboxylic acid or alkyl esters or any other derivatives thereof. Thus, the firelighter preferably comprise less than 45% by weight of $C_{12}$ carboxylic acid or derivatives thereof including ester derivatives or any other carboxylic acid with higher number of carbon atoms than 12 in the carboxylic acid component. In one embodiment, the firelighter comprises 20-80% by weight of methyl, ethyl, propyl, or buthanoyl esters of a $C_6$-$C_{10}$ carboxylic acid or mixtures thereof, and 20-55% by weight of any $C_{12}$ or higher order carboxylic acid or alkyl esters thereof The firelighter comprises in one embodiment 5-15% by weight of the curable resin. The curable resin of the firelighter of the invention is in one embodiment a polymer, preferably a urea-formaldehyde resin. The curable resin is cured by heating or addition of a catalyst, and therefore, in on embodiment, the firelighter further comprises a catalyst for curing the resin. The catalyst is for example and acid, such as a hydrochloric, a phosphoric and/or a sulphuric acid.

The firelighter may also comprise an emulsifier in order to facilitate the mixing of liquid components of the firelighter. Thus, in one embodiment, the firelighter of the invention further an emulsifying agent. Any suitable emulsifier may be used, and in a preferred embodiment the emulsifying agent is alkylbenzenesulphonic acid.

Additionally, the firelighter may comprise at least one additional component, which for example is added for facilitating the production of the firelighter, reducing the cost, or otherwise increasing the function or value of the firelighter. For example, additional component of the firelighter is in one embodiment an inorganic material, such as an material selected from the group consisting of felatar, chalk, limestone, sand, talc, fule's earth, bentonite, fly ash, finite, perlite, vermiculite, mica, calcium carbonate, sodium bicarbonate. In another embodiment, the additional component is a perfume, scent and/or a colorant.

In a specific embodiment, the firelighter comprises
a. between 55 and 85%, such as approximately 75% by weight methyl, ethyl, propyl, or buthanoyl carboxylic acid esters, or mixture thereof,
b. between 5 and 20%, such as approximately 10% by weight of said curable resin,
c. between 0 and 5%, such as approximately 0.1 by weight of said emulsifier,
d. between 0 and 5%, such as approximately 0.1 by weight of said catalyst, and
e. water to 100%.

In another aspect, the present invention relates to a method of manufacturing a firelighter, said method comprising combining one or more $C_6$-$C_{10}$ carboxylic acids and/or alkyl esters thereof or mixtures thereof in liquid form with a curable resin, and curing the resin, thereby forming a solid firelighter.

In a related embodiment, the invention relates to a method of manufacturing a solid firelighter, said method comprising combining 20-95% by weight one or more methyl, ethyl, propyl, or buthanoyl esters of a $C_6$-$C_{10}$ carboxylic acid or mixtures thereof in liquid form, with a liquid curable resin, and curing the resin, thereby forming a solid firelighter.

The methyl, ethyl, propyl, or buthanoyl esters of a $C_6$-$C_{10}$ carboxylic acid or mixtures thereof are preferably added to a final concentration of 20-85% by weight. In addition, any $C_{12}$ or higher order carboxylic acid or alkyl ester thereof are added to a final concentration of less than 55% by weight. In a preferred embodiment, the methyl, ethyl, propyl, or buthanoyl esters of a $C_6$-$C_{10}$ carboxylic acid or mixtures thereof are added to a final concentration of 20-80% by weight and 20-55% by weight of any $C_{12}$ or higher order carboxylic acid or alkyl esters thereof. Moreover, the curable resin is preferably added to a final concentration of 5-15% by weight.

In a preferred embodiment, the one or more alkyl esters are methyl or ethyl esters of a $C_6$-$C_{10}$ carboxylic acid or mixtures thereof, in particular methyl hexanoate and/or ethyl hexanoate.

In the method of the present invention for manufacturing a firelighter, the one or more alkyl esters are added to a final concentration between 55 and 85% by weight, such as between 80 and 90% by weight of said firelighter. Moreover, the method comprises adding to a final concentration of less than 45% by weight of $C_{12}$ or higher order carboxylic acid or any alkyl ester or other derivative thereof.

The curable resin of the method of the invention is preferably a polymer, such as a urea-formaldehyde resin. The methods naturally also comprise treating the combined alkyl esters and curable resin in such a manner that the resin is cured. For example, the curable resin is cured by polymerization, vulcanization, and/or crystallization. Curing is typically initiated by heating or addition of a catalyst, and thus, the method of the invention in preferred embodiments further comprise adding a catalyst and/or heating the one or more alkyl esters and curable resin for the purpose of curing the resin. The catalyst is for some curable resins an acid or an acidic composition, for example the catalyst is a hydrochloric, a phosphoric and/or a sulphuric acid.

In further embodiments, the methods of the invention comprise adding an emulsifying agent, such as alkylbenzenesulphonic acid.

In certain embodiments, the methods of the present invention further comprise adding at least one additional component, for example for the purpose of facilitating the production of the firelighter, reducing the cost, or otherwise increasing the function or value of the firelighter. In one embodiment, the additional component is an inorganic material, such as a material selected from the group consisting of felatar, chalk, limestone, sand, talc, fule's earth, bentonite, fly ash, fillite, perlite, vermiculite, mica, calcium carbonate, sodium bicarbonate. In another embodiment, the additional component is a perfume, scent and/or a colorant.

In a specific embodiment of the method of the present invention for manufacturing a firelighter, the resin is dissolved in water and mixed with approximately 0.1% by weight of an emulsifying agent, and then being then mixed with the carboxylic acid alkyl ester component to obtain a stable oil in water emulsion.

The individual amounts of the components of the firelighter manufactured according to the method of the present invention are adjusted to optimize the functionality of the firelighter and facilitate the manufacture thereof. In one embodiment, the method comprises combining by weight a. between 55 and 85% of said alkyl esters or mixture thereof, b. between 5 and 20% of said curable resin, c. between 0 and 5% of said emulsifier, d. between 0 and 5% of said catalyst, and e. water to 100%.

In one embodiment of the invention, the method comprises combining by weight
a. between 55 and 85%, such as approximately 75% by weight methyl, ethyl, propyl, or buthanoyl carboxylic acid esters, or mixture thereof,
b. between 5 and 20%, such as approximately 10% by weight of said curable resin,
c. between 0 and 5%, such as approximately 0.1 by weight of said emulsifier,
d. between 0 and 5%, such as approximately 0.1 by weight of said catalyst, and
e. water to 100%.

In third aspect, the invention relates to a use of one or more $C_6$-$C_{10}$ carboxylic acids and/or alkyl esters thereof or mixtures thereof, and a curable resin for the manufacture of a firelighter.

A related aspect of the invention relates to the use of a composition comprising 20-95% by weight one or more methyl, ethyl, propyl, or buthanoyl esters of a $C_6$-$C_{10}$ carboxylic acid or mixtures thereof, and a curable resin for the manufacture of a firelighter.

The alkyl esters and curable resin claimed for use for the manufacture of a firelighter preferably as provided herein for a firelighter of the present invention or a method of the invention for the manufacture of a firelighter. For example, the said alkyl esters claimed for use for the manufacture of a firelighter are preferably methyl and/or ethyl esters or a mixture thereof, in particular, the alkyl esters are preferably methyl hexanoate and/or ethyl hexanoate.

Moreover, in preferred embodiment of the uses of the invention, the composition comprises less than 55% by weight of any $C_{12}$ or higher order carboxylic acid or alkyl esters thereof. For example, the composition comprises 20-85% by weight of methyl, ethyl, propyl, or buthanoyl esters of a $C_6$-$C_{10}$ carboxylic acid or mixtures thereof. More specifically, the composition used for the manufacture of a firelighter according to the present invention comprises 20-80% by weight of methyl, ethyl, propyl, or buthanoyl esters of a $C_6$-$C_{10}$ carboxylic acid or mixtures thereof, and 20-55% by weight of any $C_{12}$ or higher order carboxylic acid or alkyl esters thereof. Also, the composition preferably comprises 5-15% by weight of the curable resin.

In another embodiment, the invention relates to the use of compositions comprising by weight
a. between 55 and 85%, such as approximately 75% by weight methyl, ethyl, propyl, or buthanoyl carboxylic acid esters, or mixture thereof,
b. between 5 and 20%, such as approximately 10% by weight of said curable resin,
c. between 0 and 5%, such as approximately 0.1 by weight of said emulsifier,
d. between 0 and 5%, such as approximately 0.1 by weight of said catalyst, and
e. water to 100%.

DESCRIPTION OF THE DRAWINGS

The FIGURE illustrates heat analysis comparisons of a firelighter of the present invention and n-Paraffin based and odorless kerosene firelighters.

DETAILED DESCRIPTION OF THE INVENTION

Firelighters generally comprise a combustible fuel confined in a solid matrix. The solid matrix is typically based on a curable resin, which is made solid or cured by heating or addition of a catalyst. The present invention provides a firelighter comprising a carboxylic acid alkyl ester as combustible fuel. More specifically, the firelighter comprises one or more $C_6$-$C_{10}$ carboxylic acids and/or alkyl esters thereof or mixtures thereof. The firelighter of the invention also typically comprises a curable resin.

In one embodiment, the firelighter comprises

| | |
|---|---|
| Alkyl esters and/or fatty acids | between 55-85%, for example 75% |
| Emulsifier | depending of the emulsifier, for example 0.1% |
| Polymer | between 5-20%, for example 10% |
| Catalyst | depending on the catalyst, for example 0.1% |
| Water | up 100%, for example 15% |

Carboxylic Acid

Carboxylic acids are also sometimes referred to as fatty acids, and the carboxylic acids of the present invention comprise any organic acid with the general formula R—COOH, wherein R represents a side chain/substituent. A carboxylic acid of the present invention includes saturated and non-saturated forms, straight unbranched chains and branched side chains, as well as monocarboxylic acids and multicarboxylic acids, such as di- and tri-carboxylic acids.

The carboxylic acid may comprise any number of carbon atoms, but generally comprise between 6 and 12 carbon atoms, designated as $C_6$-$C_{12}$ carboxylic acids/fatty acids, but in a preferred embodiment, the carboxylic acids comprise 6-10 carbon atoms, and even more preferred 6-8 carbon atoms; i.e. $C_6$-$C_{10}$, or $C_6$-$C_8$. The firelighter of the invention may, however, also comprise a certain amount of carboxylic acid comprising a higher number of carbon atoms, such as $C_{12}$, $C_{14}$, $C_{16}$, and/or $C_{18}$, and/or alkyl ester derivative thereof, preferably methyl, ethyl, propyl and/or buthanoyl ester derivatives.

In a specifically preferred embodiment, the combustible fuel of the provided firelighter consists substantially of $C_6$ alkyl ester, such as methyl or ethyl ester. In general, the firelighter of the invention comprises one or more alkyl esters of $C_6$-$C_{12}$ carboxylic acids, or more preferred $C_6$-$C_{10}$, or $C_6$-$C_8$ carboxylic acids. In a specific embodiment, the firelighter of the invention comprises one or more alkyl esters of $C_6$ carboxylic acid; for example methyl hexanoate and/or ethyl hexanoate.

The alkyl component of the ester is preferably a short chain, i.e. $C_1$ to $C_6$ alkyl moiety. The alkyl component is most preferably a methyl or ethyl moiety. Consequently, the firelighter of the present invention preferably comprises one or more methyl or ethyl esters of a $C_6$-$C_{12}$ carboxylic acid, more preferred one or more methyl or ethyl esters of a $C_6$-$C_{10}$, or one or more methyl or ethyl esters of a $C_6$-$C_8$ carboxylic acid. In a specific embodiment, the firelighter comprises one or more methyl or ethyl esters of a $C_6$ carboxylic acid.

The firelighter should comprise at least 20% by weight of one or more methyl, ethyl, propyl, or buthanoyl esters of a $C_6$-$C_{10}$ carboxylic acid or mixtures thereof. More preferred, the firelighter comprise 20-95%, such as 20-85, for example 20-30, 30-40, 40-50, 50-60, 60-70, 70-80 or 80-85% by weight of one or more methyl, ethyl, propyl, or buthanoyl esters of a $C_6$-$C_{10}$ carboxylic acid or mixtures thereof. In addition to the $C_6$-$C_{10}$ carboxylic acid ester, the firelighter may also comprise a certain amount of other carboxylic acids and derivatives thereof. For example, the firelighter may comprise up to 55% by weight of any $C_{12}$ or higher order carboxylic acid (e.g. $C_{12}$, $C_{14}$, $C_{16}$, $C_{18}$, and/or $C_{20}$) or derivatives such as alkyl esters thereof. In one embodiment, the firelighter comprises up to 55% by weight of $C_{16}$ and/or $C_{18}$ carboxylic acid alkyl ester, such as methyl, ethyl, propyl, or buthanoyl esters or mixtures thereof, including both saturated and non-saturated variants.

However, the firelighter should not comprise more than 55% by weight of any such $C_{12}$ or higher order carboxylic acid or derivatives such as alkyl esters thereof, as such firelighters would be less suitable as firelighters amongst others due to leakage of alkyl esters from the solid firelighter block.

Vegetable Oil

The carboxylic acids esters are for example obtained from the fatty acid and/or ester fraction of a vegetable oil. Specific carboxylic acids esters or free fatty acids may be isolated from a vegetable oil by fractionation, distillation or any other purification methodology available in the art. In one approach, the carboxylic ester used as combustible fuel in a firelighter of the present invention is purified directly from a vegetable oil. In this approach, the free fatty acids of the vegetable oil may have been esterified or transesterified before fractionation and/or purification. Alternatively, carboxylic acids or specific ranges of carboxylic acids are purified/isolated from the vegetable oil and then used for preparation of alkyl esters for a firelighter of the present invention. Thus, in one embodiment of the firelighter or methods of manufacturing a firelighter of the present invention, the one or more alkyl ester of a carboxylic acid is extracted from a vegetable oil.

The vegetable oil of the present invention may be provided as a waste vegetable oil or a pure vegetable oil. The use of waste vegetable oil may be economically beneficial when producing large amounts of refined oil. Enormous amounts of waste vegetable oil are produced annually, mainly from industrial deep fryers in potato processing plants, snack food factories and fast food restaurants. This waste product may be recycled for use in production of compositions of the present invention. Pure vegetable oil (pure plant oil (PPO) or Straight Vegetable Oil (SVO)), in contrast to waste vegetable oil, is not a by-product of other industries, and thus its prospects for use as fuel are not limited by the capacities of other industries. Important considerations when selecting a suitable vegetable oil for use in the present invention includes its suitability as a fuel, based on flash point, energy content, viscosity, combustion products and other factors, as well as the cost, based in part on yield, effort required to grow and harvest, and post-harvest processing cost.

The most common commercially used oil crops are particularly preferred. Thus, in one embodiment, the vegetable oil of the present invention, for example the vegetable oil provided in a method of the present invention, is selected from the group consisting of coconut, corn, cottonseed, olive, palm, peanut, rape, rapeseed, safflower, sesame, soybean, jatropha and sunflower oils. In a preferred embodiment, the vegetable oil is rape oil, rapeseed oil, soybean oil, jatropha or sunflower oil. In another embodiment, the vegetable oil is a nut oil, such as oil extracted from almond, cashew, hazelnut, macadamia, mongongo, pecan, pine, pistachio, and walnut. In yet another embodiment, the vegetable oil of the present invention is extracted from Castor, Coconut, Corn, Cottonseed, False, Hemp, Mustard, Palm, Peanut, Radish, Rapeseed, Ramtil, Rice, Safflower, *Salicornia*, Soybean, Sunflower, and/or Tung.

In yet another embodiment, the vegetable oil provided in the method of the present invention is in one embodiment selected from the group consisting of coconut, corn, cottonseed, olive, palm, peanut, rape, rapeseed, canola, safflower, sesame, soybean, jatropha and/or sunflower oils; for example, the vegetable oil is selected from the group consisting of sunflower oil, olive oil, rape oil soy bean oil and jatropha oil. In a preferred embodiment, the vegetable oil is a rapeseed oil, and in an even more preferred embodiment, the vegetable oil is palm tree oil or palm kernel oil.

In yet another embodiment, the vegetable oil of the present invention extracted from algae, which can be grown using waste materials such as sewage and without displacing land currently used for food production. Oil from halophytes such as *salicornia bigelovii*, may also be used as a source for a vegetable oil of the present invention, and can be grown using saltwater in coastal areas, where conventional crops cannot be grown, with yields equal to the yields of soybeans and other oilseeds grown using freshwater irrigation.

Curable Resin

The firelighter of the present invention is a solid firelighter block based on a liquid carboxylic acid ester fuel, which is structured in a solid matrix. The solid matrix is preferably prepared from a curable resin. Thus, in a broad aspect, the present invention relates to a firelighter comprising one or more alkyl esters of a $C_6$ to $C_{12}$ carboxylic acid or mixtures thereof, and a curable resin. Most preferably, the alkyl esters are methyl or ethyl ester of $C_6$, or $C_6$ and $C_8$, or $C_6$ to $C_{10}$ carboxylic acids, as described above.

A curable resin is a resin, which can be cured. In the present context, the term "curing" refers to the process of changing the physical properties of a resin or adhesive by chemical reaction, which may be in the form of condensation, polymerization, or vulcanization, Specifically, "curing" refers to the toughening or hardening of a substance, such as a polymer material, for example by cross-linking of polymer chains. Curing is accomplished by the action of a curing agent, which may be chemical additives/catalysts, ultraviolet radiation, electron beam, heat, and/or pressure, alone or in combination. In rubber, the curing process is also called vulcanization.

The firelighters of the present invention may comprise any suitable curable resin. A suitable curable resin serves the purpose of being able to confine alkyl esters of the present invention is a matrix, which can be used as a solid firelighter. In the production if certain firelighters, an oil in water emulsion is utilized, which is cured by addition of a catalyst. Other firelighters utilize a soap in oil emulsion or gel, where the soap is made by a reaction of caustic soda and stearic acid, where the curing is obtained by heating of the emulsion or gel.

Urea/formaldehyde type resin is widely used as the curable resin in the production of firelighters and the curing agent for the urea/formaldehyde resin is generally a mineral acid, conveniently a hydrochloric, phosphoric or a sulphuric acid. Thus, in preferred embodiment of the present invention, the curable resin is urea/formaldehyde; and thus, the provided firelighter preferably comprises a urea/formaldehyde resin, and one or more alkyl esters of a $C_6$ to $C_{12}$, or more preferred one or more alkyl esters of a $C_6$ to $C_{10}$, or one or more alkyl esters of a $C_6$ to $C_8$ carboxylic acid or mixtures thereof, and a urea/formaldehyde resin. In one embodiment, the provided firelighter comprises one or more alkyl esters, such as methyl or ethyl esters of a $C_6$ carboxylic acid or mixtures thereof.

The urea-formaldehyde resin may, however, also be replaced by other suitable resins, including melamine formaldehyde resin and/or polyurethane.

The amount of curable resin comprised in the firelighter of the present invention depends on the choice of resin. The person skilled in the art will appreciate in which concentrations a curable resin should be used in order to fulfill its function of establishing the matrix of the solid firelighter. Therefore, the firelighter of the present invention comprise for example between 0.1 and 90% by weight of curable resin, for example between 0.1 and 10, for example between 10 and 20, such as between 20 and 30, for example between 30 and 40, for example between 40 and 50, between 50 and 60, for example between 60 and 70%, for example between 80 and 90 by weight of a curable resin, such as urea-formaldehyde. More preferred, the firelighter of the present invention comprise between 0.1 and 20% by weight, such as between 5 and 15%, such as between 5 and 6%, for example between 6 and 7%, for example between 7 and 8%, such as between 8 and 9%, for example between 9 and 10%, for example between 10 and 11%, such as between 11 and 12%, for example between 12 and 13%, for example between 13 and 14%, such as between 14 and 15% by weight of a curable resin, such as urea-formaldehyde.

Additional Components

The firelighter of the present invention may further comprise one or more additional components. Thus, any component, which is used in the art for preparing firelighters, may be incorporated in the firelighter of the present invention, and in the methods and uses provided herein for the manufacture of a firelighter.

The firelighter of the present invention may comprise a range of additional components. For example, the compositions can optionally include one or more additional components, such as lubricants, emulsifiers, wetting agents, densifiers, fluid-loss additives, corrosion inhibitors, oxidation inhibitors, friction modifiers, demulsifers, anti-wear agents, anti-foaming agents, detergents, rust inhibitors and the like. Furthermore, other hydrocarbonaceous fuels may be added to the firelighter, provided that the final blend has the appropriate physical properties, such as flash point, viscosity, curability and toxicity properties to allow for a suitable firelighter.

The firelighter may for example comprise at least one emulsifying agent. An emulsifier or an emulgent is a substance which stabilizes an emulsion by increasing its kinetic stability. The emulsifier aids in mixing the components of the firelighter, and is used to provide firelighters affording an even distribution of the dispersed fuel phase throughout the firelighter.

Any suitable emulsifier available in the art may be added to the firelighter or used for the manufacture of the firelighter. The emulsifier is for example selected from Acetic acid esters, Citric acid esters, Datem, Distilled monoglycerides, Emulsifier blends, Lactic acid esters, Lecithin blends, Mono- and diglycerides, PGE, PGPR, Sorbitan esters or Sodium and calcium stearoyl lactylates (SSL/CSL).

In one example, the emulsifier is selected from alkylbenzenesulfonates, such as alkylbenzenesulphonic Acid Sodium Salt (CAS No 68081-81-2). In another embodiment the emulsifier is a sodium sulphosuccinate solution.

The emulsifier may for example be used in a concentration between 0 and 30% by weight, but typically the emulsifier comprises between 0.1 and 20% by weight, for example between 0.1 and 5%, or between 5 and 10%, or between 10 and 15%, or between 15 and 20% by weight of the firelighter. In a preferred embodiment, the firelighter comprises between 0.1 and 5%, such as between 0.1 and 4%, for example between 0.1 and 3%, such as between 0.1 and 2% by weight of at least one emulsifier. In a preferred embodiment, the firelighter comprises less than 5% by weight, such as less than 4%, or less than 3%, or less than 2%, such as less than 1%, for example less than 0.5%, for example less than 0.3%, such as approximately 0.1% by weight of at least one emulsifier.

It is also known to add solids to firelighter emulsions prior to curing and solidification. Such solids (particulate) may be fuels themselves e.g. coal, peat; or they may be added to control combustion or to affect raw material cost savings and may comprise, for example, sand. The inclusion of solids in particulate form can be problematic in that there is often a preferential absorption/adsorption of one or more of the components of the emulsion, with consequent destabilization and breakdown of the emulsion. Whilst it is possible to add solids particulate material to the composition, up to a level of 25% to 30% by weight, the particles of the solids particulate material must have optimum properties in terms of particle size and absortive capacity. Any departure from the optimum can lead to serious processing problems, evidenced in the worst case by complete breakdown of the emulsion and at best by the production of a wet firelighter.

The firelighter or the present invention, thus, in one embodiment, in addition to at least one alkyl ester of a $C_6$ to $C_{12}$ carboxylic acid and a curable resin, further comprise one or more solids, such as any one of those mentioned above.

Furthermore, the firelighter or the emulsion prepared in the process of manufacturing a firelighter of the present invention may comprise dyes for coloring of the firelighter. The firelighter may also comprise special dyes that will cause the flame to burn a different color, when the firelighter is in used. Moreover, the firelighter and emulsion may comprise any suitable scent or fragrance. The color and/or scent in the firelighter is employed inter alia for security reason, since a clear and noticeable colour and/or a distinguishable scent allows the user clearly observe, when the firelighter is in use, and therefore to be alert that a fire is lighting. A colour and/or scent also allow the user to detect when the firelighter is not burning anymore, for example in the case, where an additional firelighter should be lit for lighting a fire or charcoal.

In addition to combustible components, one or more inorganic materials may be added to the firelighter, to reduce cost, modify weight or performance and/or to assist further in cooling of the composition by being chilled, e.g. felspar, chalk, limestone, sand, talc, fuller's earth, bentonite, Fly ash, fillite, perlite, vermiculite, mica, calcium carbonate, or sodium bicarbonate.

Alcohol

In one embodiment, the at least one additional component of the firelighter of the present invention is a fuel supporter, such as an alcohol. The function of fuel supporter, such as an alcohol is to ensure the production of a stable flame. Moreover, the fuel supporter, such as an alcohol may serve for conservation of the firelighter. The fuel supporter may be any suitable substance for example an alcohol such as methanol, ethanol, propyl alcohol, isopropyl alcohol, butyl alcohol, isobutyl alcohol, sec-butyl alcohol, tert-butyl alcohol, pentyl alcohol, hexyl alcohol, heptyl alcohol, octyl alcohol, nonyl alcohol, decyl alcohol, allyl alcohol, cyclopentanol, cyclohexanol, benzyl alcohol and the like; glycols such as propylene glycol, ethylene glycol, dipropylene glycol, glycerol, diethylene glycol, triethylene glycol, trimethylene glycol, hexylene glycol, butylene glycol, 1,3-butanediol, thiodiethylene glycol, ammonium thioglycolate, cefatrizine glycol, polypropylene glycol, propylene glycol alginate; dichloromethane; butyl acetate; acetone; acetonitrile; ethyl acetate; and the like as well as mixtures thereof. In a preferred embodiment, the fuel supporter or alcohol is ethanol, methanol, butanol, or mixtures thereof.

The claimed firelighters for example comprise between 0 and 50% by weight alcohol, for example between 0.5 and 10%, for example between 1 and 5% by weight alcohol. The alcohol is for example selected independently from the group consisting of alcohols such as dichloromethane, butyl acetate, acetone, acetonitrile, ethyl acetate, methanol, ethanol, propyl alcohol, isopropyl alcohol, butyl alcohol (butanol), isobutyl alcohol, sec-butyl alcohol, tert-butyl alcohol, pentyl alcohol, hexyl alcohol, heptyl alcohol, octyl alcohol, nonyl alcohol, decyl alcohol, allyl alcohol, cyclopentanol, cyclohexanol, benzyl alcohol and the like; and glycols such as propylene glycol, ethylene glycol, dipropylene glycol, glycerol, diethylene glycol, tri-ethylene glycol, trimethylene glycol, hexylene glycol, butylenes glycol, 1,3-butanediol, thiodiethylene glycol, ammonium thioglycolate, cefatrizine glycol, polypropylene glycol, propylene glycol alginate; dichloromethane, butyl acetate, acetone, acetonitrile, and ethyl acetate. Preferably, the alcohol comprises one to six carbon atoms, and is for example selected from the group consisting of methanol, ethanol, propanol, butanol, pentanol, hexanol, and mixtures thereof, such as methanol, ethanol, propanol and/or butanol, for example the alcohol is ethanol, methanol and/or butanol.

The alcohol may for example be used in a concentration between 0 and 30% by weight, but typically the emulsifier comprises between 0.1 and 20% by weight, for example between 0.1 and 5%, or between 5 and 10%, or between 10 and 15%, or between 15 and 20% by weight of the firelighter. In a preferred embodiment, the firelighter comprises between 0.1 and 5%, such as between 0.1 and 4%, for example between 0.1 and 3%, such as between 0.1 and 2% by weight of at least one alcohol. In a preferred embodiment, the firelighter comprises less than 5% by weight, such as less than 4%, or less than 3%, or less than 2%, such as less than 1%, for example less than 0.5%, for example less than 0.3%, such as approximately 0.1% by weight of at least one alcohol.

Method of Manufacturing a Firelighter

The present invention also provides a method of manufacturing a firelighter, said method comprising combining one or more alkyl esters of a carboxylic acid in liquid form with a curable resin. More specifically, a method is provided of manufacturing a solid firelighter, said method comprising combining 20-95% by weight of one or more methyl, ethyl, propyl, or buthanoyl esters of a $C_6$-$C_{10}$ carboxylic acid or mixtures thereof in liquid form, with a liquid curable resin, and curing the resin, thereby forming a solid firelighter. More specific, preferred amounts of $C_6$-$C_{10}$ carboxylic acid esters are the same as indicated herein above for the solid firelighter. In one preferred embodiment of the present method, the methyl, ethyl, propyl, or buthanoyl esters of a $C_6$-$C_{10}$ carboxylic acid or mixtures thereof are added to a final concentration of 20-85% by weight, such as 20-50%, for example 20-40%, such as 20-30% by weight, or 20-30%, 30-40%, 40-50%, 50-60%, 60-70%, 70-80% or 80-85% by weight.

In one preferred embodiment, of the method, a $C_{12}$ or higher order carboxylic acid, preferably, $C_{12}$, $C_{14}$, $C_{16}$, $C_{18}$, and/or $C_{20}$, and most preferred $C_{16}$ and/or $C_{18}$ carboxylic acid and/or ester derivatives thereof, are added to a final concentration of less than 55% by weight, such as 5-55%, such as 10-20%, 20-30%, 30-40%, 40-50%, or 50-55% by weight, or 10-55%, such as 20-55%, such as 25-55%, such as 30-55%, such as 35-55%, such as 40-55%, such as 45-55%, such as 50-55% by weight.

So, in one embodiment, of the method the methyl, ethyl, propyl, or buthanoyl esters of a $C_6$-$C_{10}$ carboxylic acid or mixtures thereof are added to a final concentration of 20-80% by weight and any $C_{12}$ or higher order carboxylic acid or alkyl esters thereof is added to a final concentration of 20-55% by weight.

The one or more alkyl ester is generally any alkyl ester as provided elsewhere herein of a $C_6$-$C_{12}$ carboxylic acid, or more preferred any alkyl ester of a $C_6$-$C_{10}$ carboxylic acid, or a $C_6$-$C_8$ carboxylic acid, or most preferred a $C_6$ carboxylic acid. In a preferred embodiment, the provided method comprises combining one or more $C_6$-$C_{10}$ carboxylic acids and/or alkyl esters thereof or mixtures thereof in liquid form with a curable resin, and curing the resin, thereby forming a solid firelighter.

Alkyl esters employed in the firelighters and the manufacture thereof are described elsewhere herein. The alkyl components in the esters are preferably short chain moieties, such as $C_1$ to $C_6$, and in a most preferred embodiment the alkyl components are methyl or ethyl moieties. Thus, in a preferred embodiment, the one or more alkyl esters are methyl or ethyl esters of a $C_6$-$C_{10}$ carboxylic acid or mixtures thereof, in particular methyl hexanoate and/or ethyl hexanoate.

In the method of the present invention for manufacturing a firelighter, the one or more $C_6$-$C_{10}$ carboxylic acids and/or alkyl esters thereof or mixtures thereof, such as methyl hexanoate and/or ethyl hexanoate, are added to a final concentration between 20 and 95% by weight, such as between 40 and 90% by weight, such as between 55 and 85% by weight, such as between 60 and 90% by weight of said firelighter. In a preferred embodiment of the method for manufacture of a firelighter, approximately 75% by weight of methyl or ethyl ester is combined with a curable resin, and optionally one or more additional components, cf. elsewhere herein.

Moreover, the method comprises in one embodiment adding to a final concentration of less than 45% by weight of $C_{12}$ or higher order carboxylic acid or any alkyl ester or other derivative thereof. In another embodiment of the method less than 40%, such as less than 35% for example less than 30%, such as less than 25% for example less than 20%, such as less than 15% for example less than 10%, such as less than 5% for example less than 4%, such as less than 3% for example less than 2%, such as less than 1% by weight of a $C_{12}$ carboxylic acid or any longer chain carboxylic acid or derivatives thereof, including alkyl esters thereof, such as methyl ester or ethyl esters.

The curable resin, which is combined with one or more alkyl ester according to the method of the present invention, is preferably a polymer, preferably e biodegradable polymer. In a preferred embodiment, the curable resin is a urea-formaldehyde resin. Curable resins are also described herein above.

In the provided method, the curable resin is added in a sufficient amount to obtain a solid firelighter block after curing, the specific amount depending on the choice of curing agent and the other constituents of the firelighter block. The curable resin is for example added to a final concentration of 5-15% by weight. The curable resin is in a preferred embodiment a polymer, for example the curable resin is a urea-formaldehyde resin.

The methods of the invention for manufacturing a firelighter also comprise treating the combined alkyl esters and curable resin in such a manner that the resin is cured. For example, the curable resin is cured by polymerization, vulcanization, and/or crystallization. Curing is typically initiated by heating or addition of a catalyst, and thus, the method of the invention in preferred embodiments further comprise adding a catalyst and/or heating the one or more alkyl esters and curable resin for the purpose of curing the resin. The catalyst is for some curable resins an acid or an acidic composition, for example the catalyst is a hydrochloric, a phosphoric and/or a sulphuric acid.

The method of the invention for manufacture of a firelighter also in specific embodiments comprises adding one or more additional components. Additional components are described herein above, and is for example selected from lubricants, emulsifiers, wetting agents, densifiers, fluid-loss additives, corrosion inhibitors, oxidation inhibitors, friction modifiers, demulsifers, anti-wear agents, anti-foaming agents, detergents, rust inhibitors and the like. Furthermore, other hydrocarbonaceous fuels may be added to the firelighter, provided that the final blend has the appropriate physical properties, such as flash point, viscosity, curability and toxicity properties to allow for a suitable firelighter.

For example an emulsifier is added in order to facilitate the mixing of liquid components of the firelighter. Thus, in one embodiment, the method comprises the further addition of at least one emulsifying agent. Any suitable emulsifier may be added, and in a preferred embodiment the added emulsifying agent is alkylbenzenesulphonic acid.

In other embodiments, the methods of the present invention further comprise adding at least one additional component, for example for the purpose of facilitating the production of the firelighter, reducing the cost, or otherwise increasing the function or value of the firelighter. In one embodiment, the additional component is an inorganic material, such as a material selected from the group consisting of felatar, chalk, limestone, sand, talc, fule's earth, bentonite, fly ash, fillite, perlite, vermiculite, mica, calcium carbonate, sodium bicarbonate. In another embodiment, the additional component is a perfume, scent and/or a colorant.

In a specific embodiment of the method of the present invention for manufacturing a firelighter, the resin is dissolved in water and mixed with an emulsifying agent (for example approximately 0.1% by weight), and then being then mixed with the carboxylic acid alkyl ester component to obtain a stable oil in water emulsion.

The individual amounts of the components of the firelighter manufactured according to the method of the present invention are adjusted to optimize the functionality of the firelighter and facilitate the manufacture thereof.

The final concentration of carboxylic acid alkyl ester is generally between 20 and 95% by weight, such as between 40 and 90% by weight, such as between 55 and 85% by weight, such as between 60 and 90% by weight of said firelighter. In a preferred embodiment of the method for manufacture of a firelighter, approximately 75% by weight carboxylic acid and/or ester derivatives thereof, such as methyl or ethyl ester is combined with a curable resin, and optionally one or more additional components, cf. elsewhere herein.

The final concentration of curable resin is generally between 1 and 50% by weight, such as between 2 and 30% by weight, such as between 5 and 20% by weight, such as between 5 and 15% by weight of said firelighter. In a preferred embodiment of the method for manufacture of a firelighter, approximately 10% by weight of curable resin is combined with one or more carboxylic acid alkyl ester or mixtures thereof, and optionally one or more additional components, cf. elsewhere herein.

The final concentration of emulsifier is generally between 0 and 15% by weight, such as between 0.1 and 10% by weight of said firelighter, depending on the specific emulsifier. In a preferred embodiment of the method for manufacture of a firelighter, approximately 0.1% by weight of emulsifier is combined with one or more carboxylic acid alkyl ester or mixtures thereof and/or a curable resin, and optionally one or more additional components, cf. elsewhere herein.

The final concentration of catalyst is generally between 0 and 15% by weight, such as between 0.1 and 10% by weight of said firelighter, depending on the specific catalyst. In a preferred embodiment of the method for manufacture of a firelighter, approximately 0.1% by weight of catalyst is combined with one or more carboxylic acid alkyl ester or mixtures thereof and/or a curable resin, and optionally one or more additional components, cf. elsewhere herein.

In one embodiment, the method comprises combining by weight a. between 55 and 85% of said alkyl esters or mixture thereof, b. between 5 and 20% of said curable resin, c. between 0 and 5% of said emulsifier, d. between 0 and 5% of said catalyst, and e. water to 100%. Specifically, the alkyl esters are preferably methyl and/or ethyl hexanoate.

In general, the firelighter of present invention may be manufactured by any conventional method known in the art. Generally, the curable resin and all additional components are mixed and the liquid hydrocarbonaceous fuel, such as carboxylic acids and/or alkyl esters described herein, is then stirred into the mixture. Thus, in general, the curable resin and any additional components are mixed with water and stirred whilst adding the combustible fuel of the present invention, a carboxylic acid ester, as defined herein. The resultant emulsion is relatively stable and many such formulations may be stored for periods of up to two weeks before further treatment. The further treatment generally comprise adding the curing agent for the curable resin, whilst stirring or agitating the emulsion, and it is common in the art to dilute the curing agent. Alternatively, the emulsion or composition may be heated to initiate the curing of the resin.

In one embodiment, the method includes the steps of mixing the curable resin with water before adding the resin/water blend to an emulsion of one or more carboxylic acid alkyl esters and optionally any additional components. In one embodiment of the method for making firelighters, an acidic emulsion is formed by mixing a liquid alkyl ester fuel of the invention with water, a curing agent/catalyst and an emulsifying agent, mixing a blend of curable resin and water, and adding the blend of curable resin and water to the acidic emulsion.

In further embodiments, solids may be added to the firelighter emulsions prior to curing and solidification. Such solids (particulate) may be other fuels e.g. coal, peat; or they may be added to control combustion or to optimize raw material cost savings and may comprise, for example, sand.

The inclusion of solids in particulate form can be problematic in that there is often a preferential absorption/adsorption of one or more of the components of the emulsion, with consequent destabilisation and breakdown of the emulsion. Whilst it is possible to add solids particulate material to the composition, up to a level of 25% to 30% by weight, the particles of the solids particulate material must have optimum properties in terms of particle size and absortive capacity. Any departure from the optimum can lead to serious processing problems, evidenced in the worst case by complete breakdown of the emulsion and at best by the production of a wet firelighter.

In one embodiment, the method for making firelighters comprises the steps of mixing a liquid alkyl ester with water, a curing agent, and an emulsifying agent, mixing a blend of curable resin and water and adding the blend of curable resin and water to the acidic emulsion.

The provided method for making firelighters further comprises after addition of a catalyst or heating the emulsion, pouring the emulsion into molds, allowing the mixture to cure and then cutting the molded material to the desired shape for firelighters, such as domestic firelighters.

The curable resin used in the emulsion may be any resin which may be cured by reaction with a curing agent, but preferably the resin comprises a urea/formaldehyde type resin pre-condensate or syrup.

Preferably the curable resin comprises from 1% to 10% by weight of the emulsion, preferably between 3% and 7% of the emulsion and most preferably between 3.5% and 5% by weight thereof.

Preferably the total water content of the emulsion is in the region of 6% to 18%, more preferably from 8% to 14% and most preferably 10% to 12% of the emulsion.

The emulsion prepared by the present method may also include small amounts of thickening or suspending agents, as is well known in the art.

In one general embodiment, the method comprises combining by weight
a. between 55 and 85% of carboxylic acids or derivatives thereof, such as methyl, ethyl, propyl, or buthanoyl esters or mixtures thereof,
b. between 5 and 20% of said curable resin,
c. between 0 and 5% of said emulsifier,
d. between 0 and 5% of said catalyst, and
e. water to 100%.

In another general embodiment, the method comprises combining by weight
a. between 55 and 85% of methyl, ethyl, propyl, or buthanoyl carboxylic acid esters or mixtures thereof,
b. between 5 and 20% of said curable resin,
c. between 0 and 5% of said emulsifier,
d. between 0 and 5% of said catalyst, and
e. water to 100%.

In another embodiment, the provided method comprises combining by weight
a. between 55 and 85% of carboxylic acids or derivatives thereof, such as methyl, ethyl, propyl, or buthanoyl esters or mixtures thereof, wherein at least 30% by weight of the total content of carboxylic acids and derivatives thereof, such as 30-100, such as 30-40%, 40-50%, 50-60%, 60-70%, 70-80%, 80-90%, 90-100% by weight, is methyl, ethyl, propyl, or buthanoyl carboxylic acid esters or mixtures thereof are $C_6$-$C_{10}$ carboxylic acid esters,
b. between 5 and 20% of said curable resin,
c. between 0 and 5% of said emulsifier,
d. between 0 and 5% of said catalyst, and
e. water to 100%.

In a more specific embodiment, the method comprises combining approximately by weight
a. 75% of carboxylic acids or derivatives thereof, such as methyl, ethyl, propyl, or buthanoyl esters or mixtures thereof, wherein at least 30% by weight of the total content of carboxylic acids and derivatives thereof, such as 30-100, such as 30-40%, 40-50%, 50-60%, 60-70%, 70-80%, 80-90%, 90-100% by weight, is methyl, ethyl, propyl, or buthanoyl esters of $C_6$-$C_{10}$ carboxylic acid or mixtures thereof, and most preferred about 30% by weight of the total content of carboxylic acids and derivatives thereof is methyl, ethyl, propyl, or buthanoyl esters of $C_6$-$C_{10}$ carboxylic acid or mixtures thereof,
b. 10% by weight curable resin,
c. 0.1% by weight emulsifier,
d. 0.1% by weight catalyst, and
e. water to 100%.

Use of ester compounds for the manufacture of a firelighter

The present invention in one aspect provides a use of alkyl esters of short length carboxylic acids for the manufacture of a firelighter. A related aspect of the invention relates to the use of a composition comprising 20-95% by weight one or more methyl, ethyl, propyl, or buthanoyl esters of a $C_6$-$C_{10}$ carboxylic acid or mixtures thereof, and a curable resin for the manufacture of a firelighter.

Specifically, the invention relates to a use of one or more $C_6$-$C_{10}$ carboxylic acids and/or alkyl esters thereof or mixtures thereof, and a curable resin for the manufacture of a firelighter.

The alkyl esters and curable resin claimed for use for the manufacture of a firelighter are preferably as provided herein for a firelighter of the present invention or a method of the invention for the manufacture of a firelighter.

For example, the said alkyl esters claimed for use for the manufacture of a firelighter are preferably methyl and/or ethyl esters or a mixture thereof; in particular, the alkyl esters are preferably methyl hexanoate and/or ethyl hexanoate. Moreover, in preferred embodiment of the uses of the invention, the composition comprises less than 55% by weight of any $C_{12}$ or higher order carboxylic acid or alkyl esters thereof. In other words, the composition comprises up to 55% by weight of any $C_{12}$ or higher order carboxylic acid (preferably $C_{16}$ and/or $C_{18}$) or alkyl esters thereof, in particular methyl, ethyl, propyl and/or buthanoyl esters.

For example, the composition comprises at least 20% by weight of one or more methyl, ethyl, propyl, or buthanoyl esters of a $C_6$-$C_{10}$ carboxylic acid or mixtures thereof. More preferred, the firelighter comprise 20-95%, such as 20-85, for example 20-30, 30-40, 40-50, 50-60, 60-70, 70-80 or 80-85% by weight of one or more methyl, ethyl, propyl, or buthanoyl esters of a $C_6$-$C_{10}$ carboxylic acid or mixtures thereof.

In addition to the $C_6$-$C_{10}$ carboxylic acid ester, the composition may also comprise a certain amount of other carboxylic acids and derivatives thereof. For example, the composition may comprise up to 55% by weight of any $C_{12}$ or higher order carboxylic acid (e.g. $C_{12}$, $C_{14}$, $C_{16}$, $C_{18}$, and/or $C_{20}$) or derivatives such as alkyl esters thereof. In one embodiment, the composition comprises up to 55% by weight of $C_{16}$ and/or $C_{18}$ carboxylic acid alkyl ester, such as methyl, ethyl, propyl, or buthanoyl esters or mixtures thereof, including both saturated and non-saturated variants. More specifically, the composition used for the manufacture of a firelighter according to the present invention comprises 20-80% by weight of methyl, ethyl, propyl, or buthanoyl esters of a $C_6$-$C_{10}$ carboxylic acid or mixtures thereof, and 20-55% by weight of any $C_{12}$ or higher order carboxylic acid or alkyl esters thereof. Also, the composition comprises a curable resin, preferably in an amount of 5-15% by weight of the total composition.

In one general embodiment, the composition for use in the manufacture of a solid firelighter of the present invention comprises by weight.
a. between 55 and 85% of carboxylic acids or derivatives thereof, such as methyl, ethyl, propyl, or buthanoyl esters or mixtures thereof,
b. between 5 and 20% of said curable resin,
c. between 0 and 5% of said emulsifier,
d. between 0 and 5% of said catalyst, and
e. water to 100%.

In another general embodiment, the composition for use in the manufacture of a solid firelighter of the present invention comprises by weight
a. between 55 and 85% of methyl, ethyl, propyl, or buthanoyl carboxylic acid esters or mixtures thereof,
b. between 5 and 20% of said curable resin,
c. between 0 and 5% of said emulsifier,
d. between 0 and 5% of said catalyst, and
e. water to 100%.

In another embodiment, the composition for use in the manufacture of a solid firelighter of the present invention comprises by weight
a. between 55 and 85% of carboxylic acids or derivatives thereof, such as methyl, ethyl, propyl, or buthanoyl esters or mixtures thereof, wherein at least 30% by weight of the total content of carboxylic acids and derivatives thereof, such as 30-100, such as 30-40%, 40-50%, 50-60%, 60-70%, 70-80%, 80-90%, 90-100% by weight, is methyl, ethyl, propyl, or buthanoyl carboxylic acid esters or mixtures thereof are $C_6$-$C_{10}$ carboxylic acid esters,
b. between 5 and 20% of said curable resin,
c. between 0 and 5% of said emulsifier,
d. between 0 and 5% of said catalyst, and
e. water to 100%.

In a more specific embodiment, the composition for use in the manufacture of a solid firelighter of the present invention comprises by weight
a. 75% of carboxylic acids or derivatives thereof, such as methyl, ethyl, propyl, or buthanoyl esters or mixtures thereof, wherein at least 30% by weight of the total content of carboxylic acids and derivatives thereof, such as 30-100, such as 30-40%, 40-50%, 50-60%, 60-70%, 70-80%, 80-90%, 90-100% by weight, is methyl, ethyl, propyl, or buthanoyl esters of $C_6$-$C_{10}$ carboxylic acid or mixtures thereof, and most preferred about 30% by weight of the total content of carboxylic acids and derivatives thereof is methyl, ethyl, propyl, or buthanoyl esters of $C_6$-$C_{10}$ carboxylic acid or mixtures thereof,
b. 10% by weight curable resin,
c. 0.1% by weight emulsifier,
d. 0.1% by weight catalyst, and
e. water to 100%.

Examples

A firelighter of the present invention was tested with respect to time of burning, Ignition ability, and Soot emission Firelighter Composition 1:

| Methyl Esters and/or fatty acids | 75% |
| --- | --- |
| Emulsifier | 0.1% |
| Polymer | 10% |
| Catalyst | 0.1% |
| Water | 15% |

Firelighter Composition 2:

Dencity

| ME C6-C18 | 80.00% | 0.874 |
| --- | --- | --- |
| Urea Formaldehyd | 9.00% | 0.98 |
| Phosphor acid | 0.40% | 0.78 |
| Emulsifier | 0.10% | 1 |
| Water up to 100 | 10.50% | 1 |

Dencity

The composition of the methyl esters is indicated in the table below:

|  | Light Cut C6-C10 | Heavy Cut C16-C18 | Blend |
|---|---|---|---|
| Blend ratio | 30% | 70% | |
| SAPONIFICATION VALUE (mg KOH/g) | 0-310 | | |
| ACID VALUE (mg KOH/g) | 1 Max | | |
| IODINE VALUE (cg/g) | 1 Max | | |
| MOISTURE (%) | 0.5 Max | | |
| COLOR (Trans @ 460 nm) | 95 Min | | |
| CHAIN LENGTH DISTRIBUTION (%) | | | |
| C6: Methyl Hexanoate | 6 | | 2 |
| C8: Methyl Octanoate | 53 | | 16 |
| C10: Methyl Decanoate | 40 | | 12 |
| C12: Methyl Laurate | 1 | 1 | 1 |
| C14: Methyl Myristate | | 2 | 1 |
| C16: Methyl Palmitate | | 27 | 19 |
| C18's | | 70 | 49 |
| C18: Methyl Stearate | | 10 | 7 |
| C18 = 1: Methyl Oleate | | 60 | 42 |
| C18 = 2: Methyl Linolate | | | 0 |
| C18 = 3: Methyl Linolate | | | 0 |

Heat analysis comparisons of a firelighter of composition 2 and n-Paraffin based firelighters and odorless kerosene firelighters are illustrated in FIG. 1.

15 gram of firelighter was compared with cubes produced of n-paraffin's on the following parameters.

Time of burning—nearly the same burning time as for n-paraffin based Ignition ability—same as for n-paraffin based Soot emission—significant better than n-paraffin based, no burning smell and hardly any soot.

Items

1. A firelighter comprising one or more C6-C10 carboxylic acids and/or alkyl esters thereof or mixtures thereof, and a curable resin.
2. The firelighter of item 1, wherein said one or more alkyl esters are methyl or ethyl esters of a C6-C10 carboxylic acid or mixtures thereof.
3. The firelighter according to any of the preceding items, wherein said firelighter comprises between 55 and 85% by weight methyl hexanoate and/or ethyl hexanoate.
4. The firelighter according to any of the preceding items, wherein said firelighter comprises less than 45% by weight of any C12 or higher order carboxylic acid or alkyl esters thereof.
5. The firelighter according to any of the preceding items, wherein said curable resin is a polymer.
6. The firelighter according to any of the preceding items, wherein said curable resin is a urea-formaldehyde resin.
7. The firelighter according to any of the preceding items, said firelighter further comprising a catalyst for curing said curable resin.
8. The firelighter according to item 7, wherein said catalyst is a hydrochloric, a phosphoric and/or a sulphuric acid.
9. The firelighter according to any of the preceding items, further comprising an emulsifying agent.
10. The firelighter according to item 9, wherein said emulsifying agent is alkylbenzenesulphonic acid.
11. The firelighter according to any of the preceding items, comprising an additional component.
12. The firelighter according to any of the preceding items, wherein said additional component is an inorganic material.
13. The firelighter according to any of items 12 and 13, wherein said additional component is selected from the group consisting of felatar, chalk, limestone, sand, talc, fule's earth, bentonite, fly ash, fillite, perlite, vermiculite, mica, calcium carbonate, and sodium bicarbonate.
14. The firelighter according to any one of items 11 to 13, wherein said additional component is a perfume, scent and/or a colorant,
15. A method of manufacturing a firelighter, said method comprising combining one or more C6-C10 carboxylic acids and/or alkyl esters thereof or mixtures thereof in liquid form with a curable resin, and curing the resin, thereby forming a solid firelighter.
16. The method according to item 15, wherein said one or more alkyl esters are methyl or ethyl esters of a C6-C10 carboxylic acid or mixtures thereof
17. The method according to any one of items 15 to 16, wherein said one or more carboxylic acids or alkyl ester thereof are added to a final concentration between 55 and 85% by weight.
18. The method according to any one of items 15 to 17, wherein said one or more alkyl esters are methyl hexanoate and/or ethyl hexanoate.
19. The method according to any one of items 15 to 18, wherein any C12 or higher order carboxylic acid or alkyl ester thereof is added to a final concentration of less than 45% by weight.
20. The method according to any one of items 15 to 19, wherein said curable resin is a polymer.
21. The method according to item 20, wherein said curable resin is a urea-formaldehyde resin.
22. The method according to any one of items 15 to 21, wherein said curable resin is cured by polymerization, vulcanization, and/or crystallization.
23. The method according to any one of items 15 to 22, further comprising adding of a catalyst and/or heating said one or more alkyl esters and curable resin for the purpose of curing said resin.
24. The method according to item 23, wherein said catalyst is a hydrochloric, a phosphoric and/or a sulphuric acid.
25. The method according to any one of items 15 to 24, further comprising adding an emulsifying agent.
26. The method according to item 25, wherein said emulsifying agent is alkylbenzenesulphonic acid.
27. The method according to any one of items 15 to 26, further comprising adding at least one additional component.
28. The method according to item 27, wherein said additional component is an inorganic material.
29. The method according to item 28, wherein said inorganic material is selected from felatar, chalk, limestone, sand, talc, fule's earth, bentonite, fly ash, fillite, perlite, vermiculite, mica, calcium carbonate, and/or sodium bicarbonate.
30. The method according to any one of items 28 and 29, wherein said additional component is a perfume, a scent and/or a colorant,
31. The method according to any one of items 15 to 26, wherein said resin is dissolved in water and mixed with approximately 0.1% by weight of an emulsifying agent, and then being then mixed with the carboxylic acid alkyl ester component to obtain a stable oil in water emulsion.

32. The method according to any one of items 15 to 26, said method comprising combining by weight
   a. between 55 and 85% of said alkyl esters or mixture thereof,
   b. between 5 and 20% of said curable resin,
   c. between 0 and 5% of said emulsifier,
   d. between 0 and 5% of said catalyst, and
   e. water to 100%.

33. Use of one or more C6-C10 carboxylic acids and/or alkyl esters thereof or mixtures thereof, and a curable resin for the manufacture of a firelighter.

34. The use according to item 33, wherein said C6-C10 carboxylic acid and/or alkyl esters thereof or mixtures thereof and/or curable resin are as defined in any of the preceding items.

35. The use according to any one of the preceding items 33 and 34, wherein said alkyl esters are methyl and/or ethyl esters or a mixture thereof.

36. The use according to any one of the preceding items 33 and 35, wherein said alkyl esters are methyl hexanoate and/or ethyl hexanoate.

The invention claimed is:

1. A solid firelighter comprising 20-95% by weight of one or more methyl, ethyl, propyl, or butyl esters of a C6-C10 carboxylic acid or mixtures thereof, and 0.1-30% by weight of a curable resin.

2. The firelighter of claim 1, wherein said firelighter comprises less than 55% by weight of any $C_{12}$ or higher order carboxylic acid or alkyl esters thereof.

3. The firelighter according to claim 1, wherein said firelighter comprises 20-85% by weight of methyl, ethyl, propyl, or buthanoyl esters of a $C_6$-$C_{10}$ carboxylic acid or mixtures thereof.

4. The firelighter according to claim 1, wherein said firelighter comprises 20-80% by weight of methyl, ethyl, propyl, or buthanoyl esters of a $C_6$-$C_{10}$ carboxylic acid or mixtures thereof, and 20-55% by weight of any $C_{12}$ or higher order carboxylic acid or alkyl esters thereof.

5. The firelighter according to claim 1, wherein said firelighter comprises 55-85% by weight of methyl hexanoate and/or ethyl hexanoate.

6. The firelighter according to claim 1, wherein said firelighter comprises less than 45% by weight of any $C_{12}$ or higher order carboxylic acid or alkyl esters thereof.

7. The firelighter according to claim 1, wherein said firelighter comprises 5-15% by weight of the curable resin.

8. The firelighter according to claim 1, wherein said curable resin is a polymer.

9. The firelighter according to claim 1, wherein said curable resin is a urea-formaldehyde resin.

10. The firelighter according to claim 1, further comprising an emulsifying agent.

11. The firelighter according to claim 10, wherein said emulsifying agent is alkylbenzenesulphonic acid.

12. The firelighter according to claim 1, comprising:
   a. between 55 and 85% by weight of methyl, ethyl, propyl, or buthanoyl carboxylic acid esters or mixtures thereof,
   b. between 5 and 20% by weight of said curable resin,
   c. between 0 and 5% by weight of said emulsifier,
   d. between 0 and 5% by weight of said catalyst, and
   e. water to 100%.

13. The firelighter according to claim 1, comprising approximately
   a. 75% by weight of methyl, ethyl, propyl, or buthanoyl carboxylic acid esters or mixtures thereof,
   b. 10% by weight curable resin,
   c. 0.1% by weight emulsifier,
   d. 0.1% by weight catalyst, and
   e. water to 100%.

14. A method of manufacturing a solid firelighter, said method comprising combining 20-95% by weight of one or more methyl, ethyl, propyl, or buthanoyl esters of a $C_6$-$C_{10}$ carboxylic acid or mixtures thereof in liquid form, with a liquid curable resin, and curing the resin, thereby forming a solid firelighter.

15. The method according to claim 14, wherein said methyl, ethyl, propyl, or buthanoyl esters of a $C_6$-$C_{10}$ carboxylic acid or mixtures thereof are added to a final concentration of 20-85% by weight.

16. The method according to claim 14, wherein any $C_{12}$ or higher order carboxylic acid or alkyl ester thereof is added to a final concentration of less than 55% by weight.

17. The method according to claim 14, wherein said methyl, ethyl, propyl, or buthanoyl esters of a $C_6$-$C_{10}$ carboxylic acid or mixtures thereof are added to a final concentration of 20-80% by weight and 20-55% by weight of any $C_{12}$ or higher order carboxylic acid or alkyl esters thereof.

18. The method according to claim 14, wherein said curable resin is added to a final concentration of 5-15% by weight.

19. The method according to claim 14, wherein said curable resin is a urea-formaldehyde resin.

20. The method according to claim 14, further comprising adding an emulsifying agent.

21. The method according to claim 14, said method comprising combining by weight
   a. between 55 and 85% of methyl, ethyl, propyl, or buthanoyl carboxylic acid esters or mixtures thereof,
   b. between 5 and 20% of said curable resin,
   c. between 0 and 5% of said emulsifier,
   d. between 0 and 5% of said catalyst, and
   e. water to 100%.

22. The method according to claim 21, said method comprising combining approximately by weight
   a. 75% by weight of methyl, ethyl, propyl, or buthanoyl carboxylic acid esters or mixtures thereof,
   b. 10% by weight curable resin,
   c. 0.1% by weight emulsifier,
   d. 0.1% by weight catalyst, and
   e. water to 100%.

* * * * *